United States Patent
Nomura et al.

(10) Patent No.: US 9,352,800 B2
(45) Date of Patent: May 31, 2016

(54) HYBRID VEHICLE

(75) Inventors: Akifumi Nomura, Wako (JP); Kenichi Ohmori, Wako (JP); Akito Hiramatsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 219 days.

(21) Appl. No.: 13/637,752

(22) PCT Filed: Mar. 31, 2010

(86) PCT No.: PCT/JP2010/055964
§ 371 (c)(1),
(2), (4) Date: Dec. 10, 2012

(87) PCT Pub. No.: WO2011/121784
PCT Pub. Date: Oct. 6, 2011

(65) Prior Publication Data
US 2013/0081895 A1    Apr. 4, 2013

(51) Int. Cl.
*B62K 11/00* (2006.01)
*B62M 23/02* (2010.01)
*B60K 6/40* (2007.10)
(Continued)

(52) U.S. Cl.
CPC .................. *B62M 23/02* (2013.01); *B60K 6/40* (2013.01); *B60K 6/48* (2013.01); *B60L 11/12* (2013.01); *B62K 11/00* (2013.01); *B62K 11/04* (2013.01); *B62M 7/02* (2013.01); *B60L 2200/12* (2013.01); *B60W 2300/36* (2013.01); *B60Y 2200/12* (2013.01); *B62K 2204/00* (2013.01); *Y02T 10/6221* (2013.01); *Y02T 10/7077* (2013.01); *Y10S 903/951* (2013.01)

(58) Field of Classification Search
USPC ....................... 180/219, 291, 292; 123/179.25
See application file for complete search history.

(56) References Cited

U.S. PATENT DOCUMENTS 4,960,081 A * 10/1990 Atsuumi .................... 123/41.31
6,182,784 B1 * 2/2001 Pestotnik ...................... 180/376
(Continued)

FOREIGN PATENT DOCUMENTS

CN   1249258 A   4/2000
CN   1726141 A   1/2006
(Continued)

OTHER PUBLICATIONS

Taiwanese Office Action dated Oct. 30, 2013.
(Continued)

*Primary Examiner* — Katy M Ebner
*Assistant Examiner* — Emma K Frick
(74) *Attorney, Agent, or Firm* — Squire Patton Boggs (US) LLP

(57) ABSTRACT

A hybrid vehicle is provided in which a hybrid type power unit is mounted to a vehicle body frame, the power unit having an engine with an engine body of which part is formed by a crankcase rotatably supporting a crankshaft, a transmission for changing speed of driving force transmitted from the crankshaft, and an electric motor capable of transmitting the driving force to the transmission, wherein the electric motor (9) is mounted to a lower portion at a front face of the engine body (11A). Thus, it is possible to prevent the position of the center of gravity from becoming higher according to the disposition of the electric motor, and to carry out sufficient cooling of the electric motor by utilizing traveling wind.

8 Claims, 4 Drawing Sheets

(51) Int. Cl.
  *B60K 6/48*   (2007.10)
  *B62K 11/04*  (2006.01)
  *B62M 7/02*   (2006.01)
  *B60L 11/12*  (2006.01)

(56) References Cited

U.S. PATENT DOCUMENTS

| | | | |
|---|---|---|---|
| 6,250,415 B1 * | 6/2001 | Seto | 180/337 |
| 6,305,337 B1 * | 10/2001 | Sumi et al. | 123/179.25 |
| 6,438,949 B1 * | 8/2002 | Nozaki | 60/322 |
| 6,848,406 B2 * | 2/2005 | Ibukuro et al. | 123/179.25 |
| 7,114,588 B2 * | 10/2006 | Kudo et al. | 180/219 |
| 7,182,169 B2 * | 2/2007 | Suzuki | 180/426 |
| 7,284,523 B2 * | 10/2007 | Fukuzawa et al. | 123/179.25 |
| 7,347,296 B2 * | 3/2008 | Nakamura et al. | 180/68.1 |
| 7,730,986 B2 * | 6/2010 | Takeshima et al. | 180/68.5 |
| 7,766,119 B2 * | 8/2010 | Yokoi et al. | 180/311 |
| 7,784,582 B2 * | 8/2010 | Takahashi et al. | 180/336 |
| 7,954,853 B2 * | 6/2011 | Davis et al. | 280/783 |
| 8,256,564 B2 * | 9/2012 | Oguri et al. | 180/309 |
| 8,348,005 B2 * | 1/2013 | Hanawa et al. | 180/292 |
| 2002/0033295 A1 * | 3/2002 | Korenjak et al. | 180/292 |
| 2005/0211481 A1 | 9/2005 | Sasamoto | |
| 2005/0274346 A1 * | 12/2005 | Fukuzawa et al. | 123/179.25 |

FOREIGN PATENT DOCUMENTS

| | | |
|---|---|---|
| CN | 1736754 A | 2/2006 |
| DE | 202 09 976 U1 | 11/2002 |
| DE | 10 2006 001 258 A1 | 7/2007 |
| EP | 1 142 744 A1 | 10/2001 |
| EP | 1 839 925 A2 | 10/2007 |
| JP | 06-008873 A | 1/1994 |
| JP | 08-175475 A | 7/1996 |
| JP | 2005001410 A | 1/2005 |
| JP | 2006-76496 A | 3/2006 |
| JP | 2007-269253 A | 10/2007 |
| JP | 2010-6280 A | 1/2010 |
| TW | M347332 U | 12/2001 |
| TW | I238797 B | 9/2005 |
| TW | I273047 B | 2/2007 |
| TW | I296976 B | 5/2008 |
| TW | I303233 A | 11/2008 |
| TW | M347332 U | 12/2008 |
| WO | 2006/095210 A1 | 9/2006 |
| WO | WO 2009/157455 A1 | 12/2009 |

OTHER PUBLICATIONS

International Search Report dated Jun. 15, 2010 corresponding to International Patent Application No. PCT/JP2010/055964 and English translation thereof.
European Search Report application No. EP 10 84 8960 dated Jul. 3, 2013.
Chinese Office Action application No. 201080065954.0 dated Aug. 29, 2014.

* cited by examiner

HYBRID VEHICLE

TECHNICAL FIELD

The present invention relates to a hybrid vehicle including a hybrid type power unit mounted to a vehicle body frame, the power unit including an engine having an engine body of which part is formed by a crankcase rotatably supporting a crankshaft, a transmission for changing speed of driving force transmitted from the crankshaft, and an electric motor capable of transmitting the driving force to the transmission.

BACKGROUND ART

Patent Document 1 discloses a hybrid vehicle in which an electric motor capable of applying torque to a power transmission system including a crankshaft is disposed rearward of a cylinder block included in an engine.

PRIOR ART DOCUMENT

Patent Document

Patent Document 1: Japanese Patent Application Laid-open No. 2007-269253

SUMMARY OF THE INVENTION

Problem to be Solved by the Invention

However, the vehicle disclosed in Patent Document 1 has the center of gravity at a high position since the electric motor which is a heavy load is arranged in an upper portion of a crankcase, and moreover, it is difficult for the electric motor disposed rearward of the cylinder block to be exposed to traveling wind, and therefore, there is a demand for cooling the electric motor with the traveling wind.

The present invention has been made in consideration for such circumstances. An object of the present invention is to provide a hybrid vehicle which is capable of preventing the position of the center of gravity from becoming higher according to the disposition of an electric motor, and also achieving sufficient cooling of the electric motor by utilizing traveling wind.

Means for Solving the Problem

In order to attain the above object, according to a first aspect of the present invention, there is provided a hybrid vehicle including a hybrid vehicle including a hybrid type power unit mounted on a vehicle body frame, the hybrid type power unit including: an engine having an engine body of which part is formed by a crankcase rotatably supporting a crankshaft; a transmission for changing speed of driving force transmitted from the crankshaft; and an electric motor capable of transmitting the driving force to the transmission, characterized in that the electric motor is attached to a lower portion of a front face of the engine body.

Further, according to a second aspect of the present invention, in addition to the configuration of the first aspect, an exhaust pipe having an upstream end thereof connected to a front face of a cylinder head which forms a portion of the engine body extends rearwardly below the engine body from the front of the engine body, and at least a portion of the electric motor is disposed in a region surrounded by the lower portion of the engine body and the exhaust pipe in a side view.

According to a third aspect of the present invention, in addition to the configuration of the second aspect, the exhaust pipe extends out forwardly and downwardly from the cylinder head toward one side in a vehicle width direction, and the electric motor is attached to the lower portion of the front face of the engine body on the other side in the vehicle width direction, avoiding the exhaust pipe when the engine body is seen from the front.

According to a fourth aspect of the present invention, in addition to the configuration of the third aspect, the electric motor is disposed in such a manner that an output end of a motor shaft is oriented in a direction opposite to the exhaust pipe in the vehicle width direction.

According to a fifth aspect of the present invention, in addition to any one of the configuration of the first to fourth aspects, a control unit and a battery are disposed above the crankcase.

According to a sixth aspect of the present invention, in addition to the configuration of the first aspect, the engine body is mounted on the vehicle body frame with a cylinder axis thereof inclined rearwardly and upwardly, an intake system is connected to a front face of an upper portion of the engine body, and the electric motor located below the intake system is attached to the lower portion of the front face of the engine body.

According to a seventh aspect of the present invention, in addition to any one of the configuration of the first to sixth aspects, the electric motor is disposed on an opposite side of an axis of the crankshaft from an input shaft of the transmission, and a distance between an axis of the motor shaft included in the electric motor and the axis of the crankshaft is set substantially equal to a distance between an axis of the input shaft and the axis of the crankshaft.

Moreover, according to an eighth aspect of the present invention, in addition to the configuration of the seventh aspect, the hybrid vehicle further comprises a motor-side primary gear mechanism for transmitting power from the motor shaft of the electric motor to the transmission side, the motor-side primary gear mechanism including a pair of idle gears, wherein one of the idle gears is disposed coaxially with the crankshaft, and the other one of the idle gears is disposed between vertical planes passing through the axis of the crankshaft and the axis of the motor shaft, respectively.

Effects of the Invention

According to the first aspect of the present invention, the electric motor is attached to the lower portion of the front face of the engine body. Thus, a hybrid vehicle having the center of gravity at a low position can be achieved by the arrangement of the electric motor, which is a heavy load, in the lower portion of the engine body, and moreover, the electric motor can be effectively cooled by sufficient exposure of the electric motor to traveling wind.

According to the second aspect of the present invention, the exhaust pipe having the upstream end connected to the front face of the cylinder head extends rearwardly below the engine body from the front of the engine body, and at least a portion of the electric motor is disposed in a region surrounded by the lower portion of the engine body and the exhaust pipe in the side view. This enables suppressing protrusion of the electric motor from the lower portion of the front face of the engine body.

According to the third aspect of the present invention, the electric motor is disposed avoiding the exhaust pipe when the engine body is seen from the front. This enables lessening the thermal influence of the exhaust pipe upon the electric motor.

According to the fourth aspect of the present invention, the electric motor is disposed in such a manner that the output end of the motor shaft is oriented in the direction opposite to the exhaust pipe in the vehicle width direction. Thus, means for transmitting driving force from the electric motor to a power transmission system leading from the crankshaft to the transmission can be disposed without being affected by the exhaust pipe.

According to the fifth aspect of the present invention, the control unit and the battery are disposed above the crankcase. Thus, space above the crankcase, formed by the arrangement of the electric motor in the lower portion of the front face of the engine body, can be effectively used for disposition of the control unit and the battery.

According to the sixth aspect of the present invention, the cylinder axis of the engine body is inclined rearwardly and upwardly, and the electric motor is disposed below the intake system connected to the upper portion of the front face of the engine body. Thus, the electric motor can be effectively arranged in the lower portion of the front face of the engine body without being affected by the thermal influence of the exhaust pipe.

According to the seventh aspect of the present invention, the distance between the axis of the crankshaft and the axis of the motor shaft of the electric motor disposed on the opposite side of the axis of the crankshaft from the input shaft of the transmission is substantially equal to the distance between the axis of the input shaft and the axis of the crankshaft. Thus, the clutches on the input shaft, and the electric motor, which are heavy loads, are disposed in well-balanced relation, and moreover, the electric motor and the transmission can be disposed in a compact configuration around the crankshaft.

Further, according to the eighth aspect of the present invention, one of the pair of the idle gears included in the motor-side primary gear mechanism is disposed coaxially with the crankshaft, and the other idle gear is disposed between the vertical planes passing through the axis of the crankshaft and the axis of the motor shaft, respectively. Thus, although a distance between the input shaft of the transmission and the electric motor becomes relatively large, since the crankshaft may also serve as one of the idle shafts, the reduction of the idle shafts exclusively used enables the motor-side primary gear mechanism to be formed in a compact size, using a pair of the idle gears.

Figure 1:
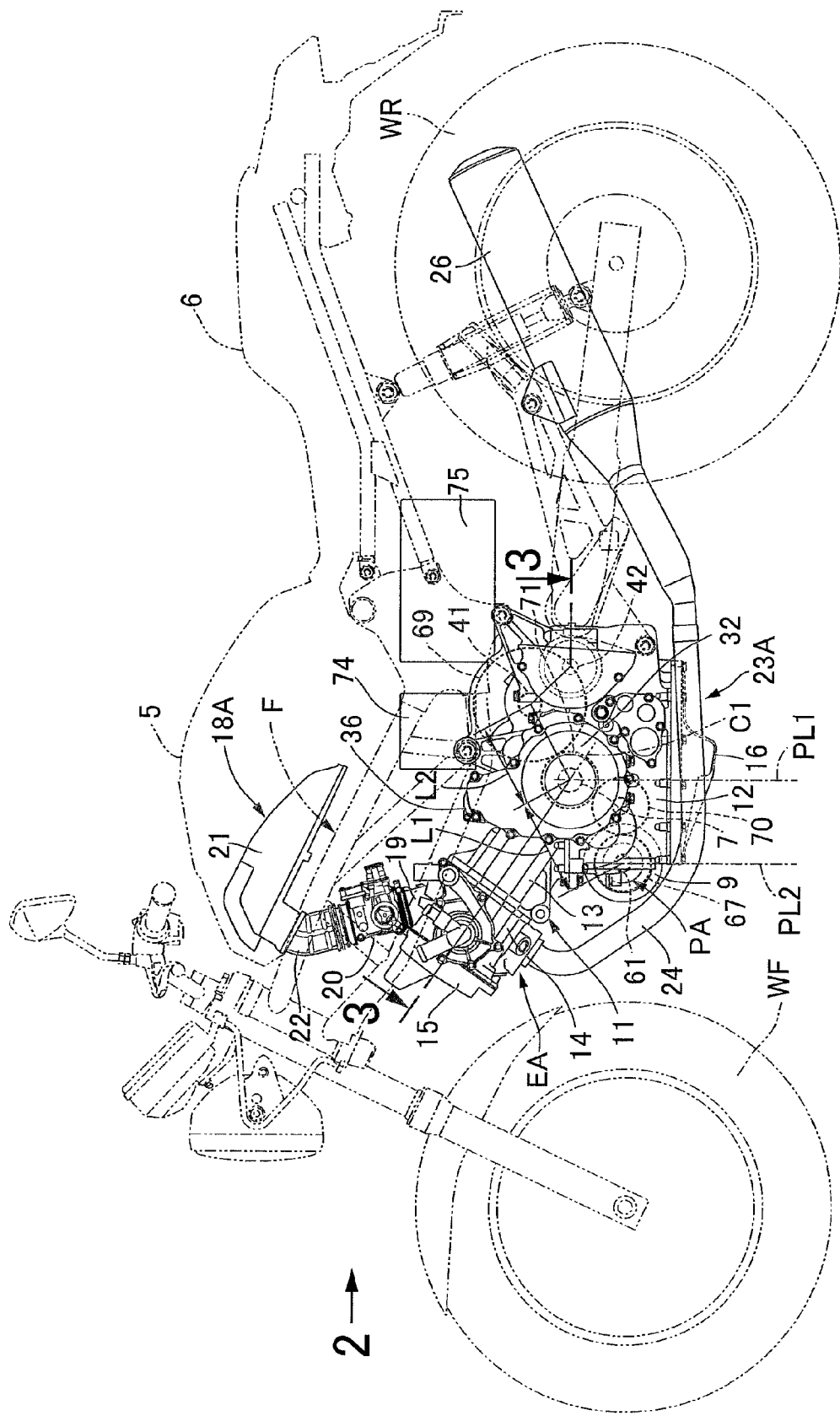
FIG. 1 is a side view of a two-wheeled motor vehicle according to a first embodiment.
(First embodiment)

EXPLANATION OF REFERENCE NUMERALS AND SYMBOLS 7 crankshaft
9 electric motor
11A, 11B engine body
12 crankcase
14 cylinder head
18B intake system
24, 25 exhaust pipe
63 motor-side primary gear mechanism
70, 71 idle gear
74 control unit
75 battery
EA, EB engine
M transmission
PA, PB hybrid type power unit

MODES FOR CARRYING OUT THE INVENTION

Figure 2:
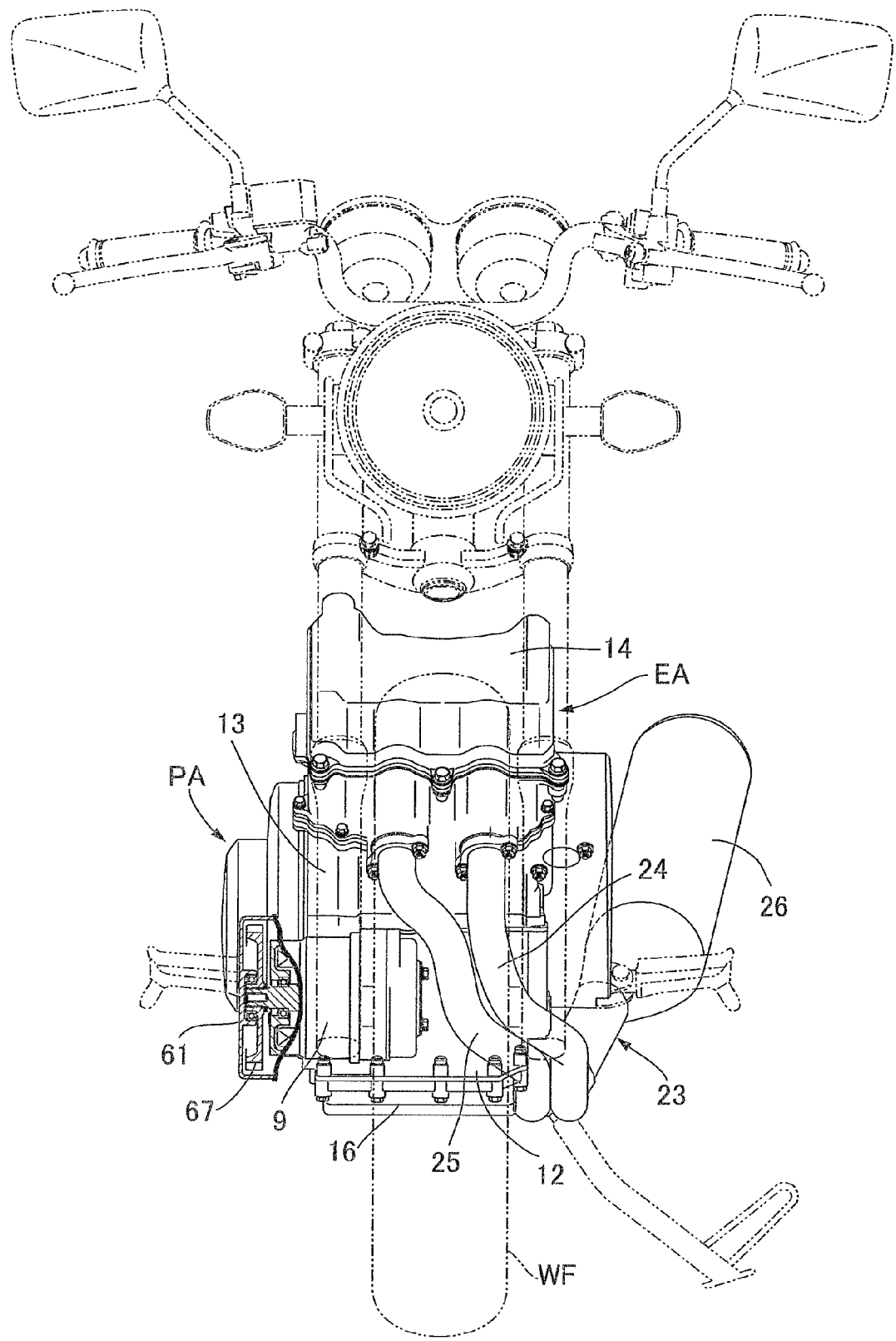
FIG. 2 is a view from arrow 2 in FIG. 1. (First embodiment)

Embodiments of the present invention will be described with reference to the accompanying drawings.
First Embodiment
A first embodiment of the present invention will be described with reference to FIGS. 1 to 3. Referring first to FIGS. 1 and 2, a hybrid type power unit PA disposed between a front wheel WF and a rear wheel WR is mounted on a vehicle body frame F of a two-wheeled motor vehicle configured as a hybrid vehicle, and a fuel tank 5 disposed above the hybrid type power unit PA and a passenger seat 6 located rearward of the fuel tank 5 are provided on the vehicle body frame F.

Figure 3:
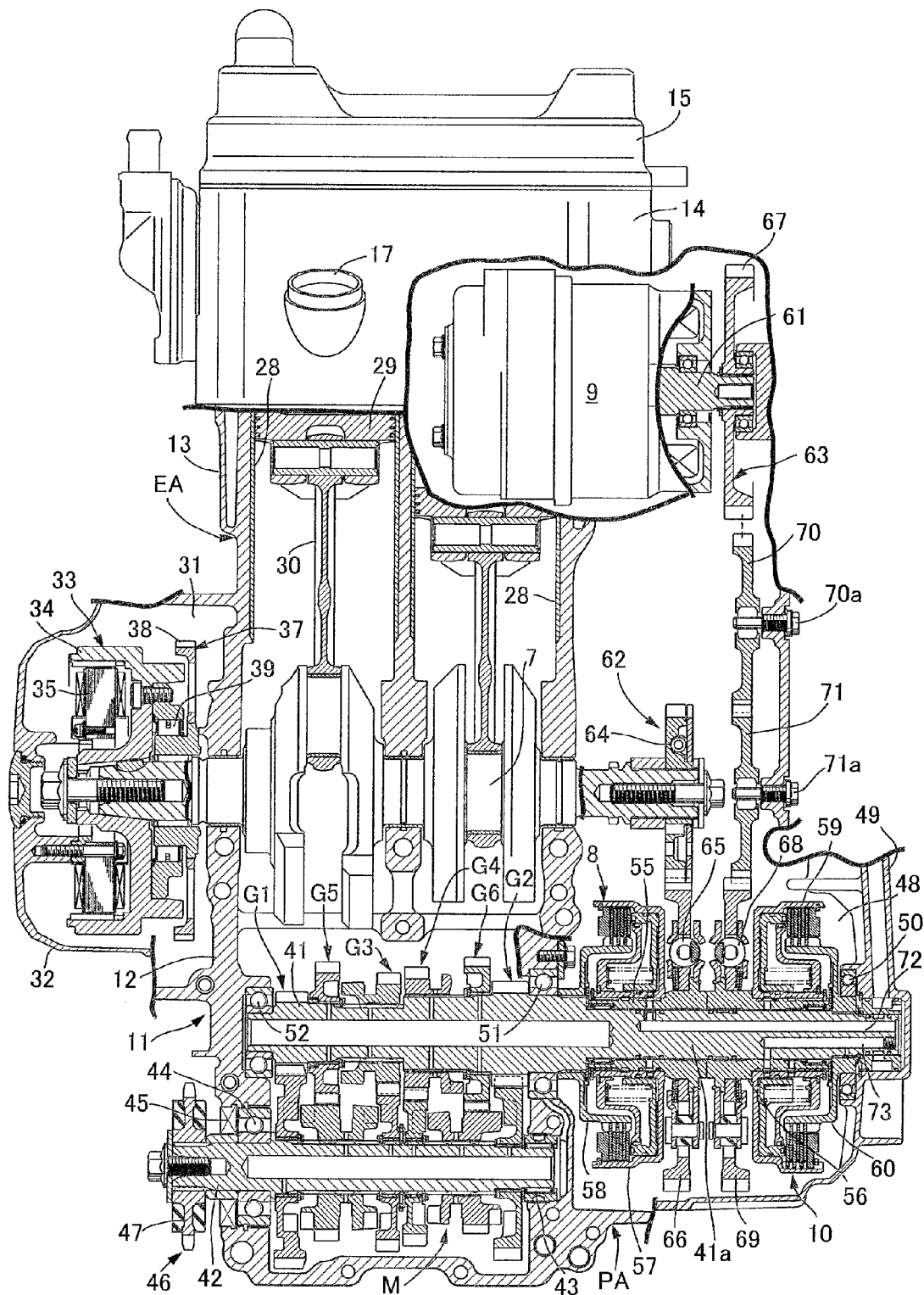
FIG. 3 is a sectional view taken along a line 3-3 in FIG. 1. (First embodiment)

Referring to FIG. 3 in conjunction, the hybrid type power unit PA includes an engine EA having a crankshaft 7 and configured as a two-cylinder engine for example, a transmission M for changing the speed of driving force transmitted from the crankshaft 7, an engine-side clutch 8 capable of switching between the transmission of the power from the crankshaft 7 to the transmission M and the interruption of the transmission, an electric motor 9 capable of transmitting the driving force to the transmission M, and a motor-side clutch 10 capable of switching between the transmission of the power from the electric motor 9 to the transmission M and the interruption of the transmission.

An engine body 11A of the engine EA includes a crankcase 12 rotatably supporting the crankshaft 7 having an axis extending in a vehicle width direction, a cylinder block 13 having a forward-tilted cylinder axis C1 and joined to an upper end of a front portion of the crankcase 12, a cylinder head 14 joined to an upper end of the cylinder block 13, and a head cover 15 joined to an upper end of the cylinder head 14, and an oil pan 16 is joined to a lower portion of the crankcase 12.

A side face of a rear portion of the cylinder head 14 is provided with a pair of intake ports 17 and 17, and an intake system 18A is connected to the intake ports 17, as shown in FIG. 1. Then, the intake system 18A includes intake pipes 19 connected to the intake ports 17, respectively, throttle bodies 20 connected to upstream ends, respectively, of the intake pipes 19, an air cleaner 21 disposed in such a way as to be covered with a front portion of the fuel tank 5, and connecting tubes 22 which provide links between the throttle bodies 20 and the air cleaner 21, and the intake system 18A extends out upwardly from the cylinder head 14.

Also, an exhaust system 23A is connected to a side face of a front portion of the cylinder head 14, and the exhaust system 23A includes a pair of exhaust pipes 24 and 25 connected at upstream ends to a pair of exhaust ports (unillustrated), respectively, provided in a front face of the cylinder head 14, and extending rearwardly below the engine body 11A from the front of the cylinder head 14, and an exhaust muffler 26 disposed on the right side of the rear wheel WR and connected to the exhaust pipes 24 and 25.

The cylinder block 13 has plural, e.g. two, cylinder bores 28 arranged side by side in the vehicle width direction, and pistons 29 slidably fitted in the cylinder bores 28, respectively, are connected to the crankshaft 7 through connecting rods 30, respectively.

A left casing cover 32 having a generator chamber 31 formed between the left casing cover 32 and the crankcase 12 is joined to a left side face of the crankcase 12. A rotor 34 of a generator 33 accommodated in the generator chamber 31 is fixed to an end portion of the crankshaft 7 extending into the generator chamber 31, and a stator 35 of the generator 33 is fixed to the left casing cover 32 in such a way as to be surrounded by the rotor 34.

Also, as shown in FIG. 1, a starting motor 36 is fixedly disposed above the crankcase 12 in such a way as to be covered from the side with an upper end portion of the left casing cover 32, and a follower gear 38 which forms a portion of a reduction gear train 37 for transmitting power from the starting motor 36 is linked to the rotor 34 through a one-way clutch 39.

The transmission M is a gear transmission formed of gear trains with plural levels of speeds which can be selectively established, e.g. first to sixth speed gear trains G1 to G6, which are provided between a main shaft 41 and a countershaft 42 each having an axis parallel to the crankshaft 7 and rotatably supported in the crankcase 12.

One end portion of the countershaft 42 is rotatably supported on a right sidewall of the crankcase 12 with a roller bearing 43 in between, and the other end portion of the countershaft 42 protrudes through the left side face of a rear portion of the crankcase 12 with a ball bearing 44 and an annular sealing member 45 interposed in between the countershaft 42 and the crankcase 12. A drive sprocket 47 which forms a portion of chain-driven power transmission means 46 for transmitting rotating power outputted by the transmission M to the rear wheel WR is fixed to the end portion of the countershaft 42 protruding from the crankcase 12.

A right casing cover 49 having a clutch chamber 48 formed between the right casing cover 49 and the crankcase 12 is joined to a right side face of the crankcase 12. The main shaft 41 as an input shaft of the transmission M has an extending portion 41a extending out from the crankcase 12 toward the clutch chamber 48, and the main shaft 41 is rotatably supported at at least two portions thereof, or two portions thereof in the case of the first embodiment, in the crankcase 12. Then, one end portion of the main shaft 41, or a tip end portion of the extending portion 41a, is rotatably supported in the right casing cover 49 with a clutch inner 60 of the motor-side clutch 10 and a ball bearing 50 in between, an intermediate portion of the main shaft 41 is rotatably supported in the crankcase 12 with a ball bearing 51 in between, and the other end portion of the main shaft 41 is rotatably supported in the crankcase 12 with a ball bearing 52 in between.

The engine-side clutch 8 and the motor-side clutch 10 are hydraulic clutches capable of switching between mode of interruption of power transmission under no action of hydraulic pressure and mode of power transmission under the action of hydraulic pressure, independently of each other, and the clutches are provided coaxially with and adjacent to the extending portion of the main shaft 41 and are accommodated in the clutch chamber 48.

The extending portion 41a of the main shaft 41 is fitted with an engine-side power transmission cylinder shaft 55 and a motor-side power transmission cylinder shaft 56, which are provided axially adjacent to and rotatably relative to each other in such a manner that the engine-side power transmission cylinder shaft 55 is disposed on the crankcase 12 side. Then, the engine-side clutch 8 is configured as a multi-plate clutch including a clutch outer 57 which rotates together with the engine-side power transmission cylinder shaft 55, and a clutch inner 58 joined to the extending portion 41a of the main shaft 41 for non-rotation relative to each other, and the motor-side clutch 10 is configured as a multi-plate clutch including a clutch outer 59 which rotates together with the motor-side power transmission cylinder shaft 56, and the clutch inner 60 joined to the extending portion of the main shaft 41. Moreover, the engine-side clutch 8 and the motor-side clutch 10 are provided on the extending portion 41a with their clutch outers 57, 59 opening in directions opposite to each other.

The electric motor 9 has a motor shaft 61 parallel to the crankshaft 7 and is attached to a lower portion of a front face of the engine body 11A, or a lower portion of a front face of the crankcase 12 in the case of the first embodiment.

Moreover, at least a portion of the electric motor 9 (or a portion thereof in the case of the first embodiment) is disposed in a region surrounded by the lower portion of the engine body 11A and the exhaust pipes 24 and 25 in a side view as shown in FIG. 1. Moreover, as shown in FIG. 2, the exhaust pipes 24 and 25 extend out forwardly and downwardly from the cylinder head 14 toward one side in the vehicle width direction, while the electric motor 9 is attached to the lower portion of the front face of the crankcase 12 on the other side in the vehicle width direction, avoiding the exhaust pipes 24 and 25 when the engine body 11A is seen from the front.

An engine-side primary gear mechanism 62 is provided between the crankshaft 7 and the engine-side clutch 8, a motor-side primary gear mechanism 63 is provided between the motor shaft 61 of the electric motor 9 and the motor-side clutch 10, and the engine-side primary gear mechanism 62 and the motor-side primary gear mechanism 63 are disposed between the engine-side clutch 8 and the motor-side clutch 10.

Then, the engine-side primary gear mechanism 62 is made up of a first drive gear 64 provided on the crankshaft 7, and a first driven gear 66 linked to the engine-side power transmission cylinder shaft 55 through a shock absorbing spring 65, which are arranged in meshing engagement with each other.

Also, the motor-side primary gear mechanism 63 is formed to include a pair of idle gears 70, 71 and is formed of a second drive gear 67 provided on the motor shaft 61, a second driven gear 69 linked to the motor-side power transmission cylinder shaft 56 through a shock absorbing spring 68, the first idle gear 70 having a meshing engagement with the second drive gear 67, and the second idle gear 71 having meshing engagements with the first idle gear 70 and the second driven gear 69, and the first and second idle gears 70, 71 are rotatably supported in the right casing cover 49 through idle shafts 70a, 71a, respectively.

Moreover, the electric motor 9 is disposed on the opposite side of the axis of the crankshaft 7 from the main shaft 41 of the transmission M so that the electric motor 9 is substantially symmetrical to the main shaft 41 about the axis of the crankshaft 7, a distance L1 (see FIG. 1) between an axis of the motor shaft 61 included in the electric motor 9 and the axis of the crankshaft 7 is set substantially equal to a distance L2 (see FIG. 1) between the axis of the main shaft 41 and the axis of the crankshaft 7, and an output end of the motor shaft 61, or the second drive gear 67, is disposed in such a way as to be oriented in the opposite direction from the exhaust pipes 24 and 25 in the vehicle width direction.

Also, the second idle gear 71 as one of a pair of the idle gears 70, 71 included in the motor-side primary gear mechanism 63 is disposed coaxially with the crankshaft 7, and the first idle gear 70 as the other of the idle gears 70, 71 is disposed between vertical planes PL1, PL2 (see FIG. 1) passing through the axis of the crankshaft 7 and the axis of the motor shaft 61, respectively.

The extending portion 41a of the main shaft 41 is provided with a first control oil path 72 for guiding control hydraulic pressure to the engine-side clutch 8, and a second control oil path 73 for guiding control hydraulic pressure to the motor-side clutch 10, and hydraulic pressures guided by the first and second control oil paths 72, 73 are individually controlled by a hydraulic pressure control valve (unillustrated) provided in the right casing cover 49.

Returning to FIG. 1, the vehicle body frame F supports a control unit 74 for controlling operation of the electric motor 9, and a battery 75 for supplying electric power to the electric motor 9, the control unit 74 is disposed between a region above the crankcase 12 and a rearward lower portion of the fuel tank 5, and the battery 75 is disposed rearward of the control unit 74, above the crankcase 12 and below a front portion of the passenger seat 6.

Next, description will be given with regard to operations of the first embodiment. The engine-side clutch 8 is provided between the crankshaft 7 of the engine EA and the transmission M, and the motor-side clutch 10 is provided between the electric motor 9 and the transmission M. Thereby, driving force from the electric motor 9 can be transmitted to an input side of the transmission M, and thus, the electric motor 9, even if small in size, enables the transmission M to output desired driving force. The motor-side clutch 10 is capable of connecting and disconnecting the electric motor 9 to and from the transmission M. Thereby, disengagement of the engine-side clutch 8 enables using the electric motor 9 alone to achieve a drive, and also, disengagement of the motor-side clutch 10 enables the electric motor 9 to be disconnected from a drive system, thus achieving a reduction in rotational friction.

Also, the engine-side clutch 8 capable of switching between the transmission of power from the crankshaft 7 to the transmission M and the interruption of the transmission is disposed coaxially with and adjacent to the motor-side clutch 10 capable of switching between the transmission of power from the electric motor 9 to the transmission M and the interruption of the transmission. This enables design such that the engine-side clutch 8 and the motor-side clutch 10 share space for their disposition, thus achieving a simple and small-sized configuration of the hybrid type power unit PA.

Also, the engine-side clutch 8 and the motor-side clutch 10 are provided on the main shaft 41 as the input shaft of the transmission M. This enables a compact configuration of the transmission M, the engine-side clutch 8 and the motor-side clutch 10.

Also, the engine-side primary gear mechanism 62 provided between the crankshaft 7 and the engine-side clutch 8, and the motor-side primary gear mechanism 63 provided between the electric motor 9 and the motor-side clutch 10 are disposed between the engine-side clutch 8 and the motor-side clutch 10. Thereby, driving force transmission paths from the engine EA and the electric motor 9, respectively, can be collectively configured for compact packing.

Also, the extending portion 41a of the main shaft 41 rotatably supported at at least two portions thereof in the crankcase 12, extending out from the crankcase 12, is provided with the engine-side clutch 8 and the motor-side clutch 10 in such a manner that the engine-side clutch 8 is disposed so that the crankcase 12 is closer to the engine-side clutch 8 than to the motor-side clutch 10. Thereby, the engine-side clutch 8 which receives an input of a large drive torque from the engine EA is disposed at a position close to the portion of the main shaft 41 supported in the crankcase 12, so that load on the main shaft 41 can be reduced.

Moreover, the electric motor 9 which is a heavy load is attached to the lower portion of the front face of the engine body 11A. Thereby, a hybrid vehicle having the low center of gravity can be achieved, and moreover, the electric motor 9 can be effectively cooled by sufficient exposure of the electric motor 9 to traveling wind.

Also, the exhaust pipes 24 and 25 connected at the upstream ends to the front face of the cylinder head 14 extend rearwardly below the engine body 11A from the front of the engine body 11A, and at least a portion of the electric motor 9 is disposed in the region surrounded by the lower portion of the engine body 11A and the exhaust pipes 24 and 25 in the side view. This enables suppressing protrusion of the electric motor 9 from the lower portion of the front face of the engine body 11A.

Also, the exhaust pipes 24 and 25 extend out forwardly and downwardly from the cylinder head 14 toward one side in the vehicle width direction, and the electric motor 9 is attached to the lower portion of the front face of the engine body 11A on the other side in the vehicle width direction, avoiding the exhaust pipes 24 and 25 when the engine body 11A is seen from the front. This enables lessening the thermal influence of the exhaust pipes 24 and 25 upon the electric motor 9.

Also, the electric motor 9 is disposed in such a manner that the output end of the motor shaft 61 is oriented in the direction opposite to the exhaust pipes 24 and 25 in the vehicle width direction. Thereby, means for transmitting driving force from the electric motor 9 to a power transmission system leading from the crankshaft 7 to the transmission M, namely, the motor-side primary gear mechanism 63, can be disposed without being affected by the exhaust pipes 24 and 25.

Also, the control unit 74 and the battery 75 are disposed above the crankcase 12. Thereby, space above the crankcase 12, formed by the arrangement of the electric motor 9 in the lower portion of the front face of the engine body 11A can be effectively used for disposition of the control unit 74 and the battery 75.

Also, the electric motor 9 is disposed on the opposite side of the axis of the crankshaft 7 from the main shaft 41 of the transmission M, and the distance L1 between the axis of the motor shaft 61 included in the electric motor 9 and the axis of the crankshaft 7 is set substantially equal to the distance L2 between the axis of the main shaft 41 and the axis of the crankshaft 7. Thereby, the engine-side clutch 8 and the motor-side clutch 10 on the main shaft 41, and the electric motor 9, which are heavy loads, are disposed in well-balanced relation, and moreover, the electric motor 9 and the transmission M can be disposed in a compact configuration around the crankshaft 7.

Further, the motor-side primary gear mechanism 63 is formed to include the first and second idle gears 70, 71 each having substantially the same diameter as that of the first drive gear 64 provided on the crankshaft 7, which forms a portion of the engine-side primary gear mechanism 62, the second idle gear 71 is disposed coaxially with the crankshaft 7, and the first idle gear 70 is disposed between the vertical planes PL1, PL2 passing through the axis of the crankshaft 7 and the axis of the motor shaft 61, respectively. Thereby, although a distance between the main shaft 41 of the transmission M and the electric motor 9 becomes relatively large, the use of the pair of the idle gears 70, 71 enables a compact configuration of the motor-side primary gear mechanism 63.

Incidentally, in FIG. 3, the second idle gear 71 is shown as supported using the idle shaft 71a for the second idle gear 71 only; however, the crankshaft 7 may also be used to support the second idle gear 71.

Second Embodiment

Figure 4:
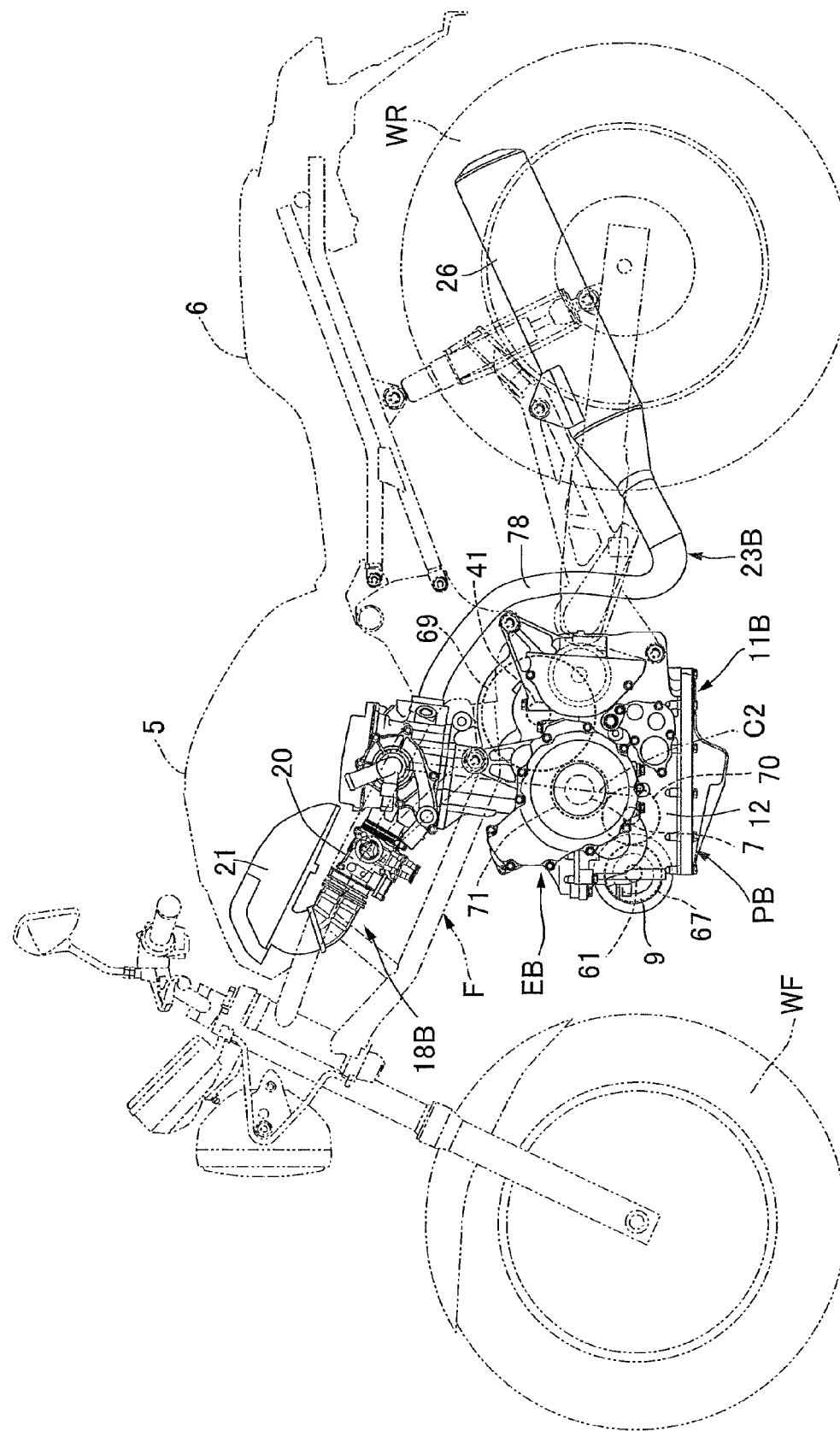
FIG. 4 is a side view of a two-wheeled motor vehicle according to a second embodiment.
(Second embodiment)

A second embodiment of the present invention will be described with reference to FIG. 4; however, portions corresponding to those of the first embodiment are designated by the same reference numerals and illustrated only in the drawing, and detailed description of the corresponding portions will be omitted.

An engine body 11B included in an engine EB of a hybrid type power unit PB is mounted on the vehicle body frame F with a cylinder axis C2 inclined slightly rearwardly and upwardly, an intake system 18B including the throttle bodies 20 and the air cleaner 21 is connected to an upper portion of a front face of the engine body 11B, and the electric motor 9 located below the intake system 18B is attached to a lower portion of the front face of the engine body 11B.

Also, an exhaust system 23B including exhaust pipes 78 and 78 extending rearwardly from an upper portion of the engine body 11B and connected to the exhaust muffler 26 on the right side of the rear wheel WR is connected to an upper portion of a rear face of the engine body 11B.

According to the second embodiment, the electric motor 9 can be effectively arranged in the lower portion of the front face of the engine body 11B without being affected by the thermal influence of the exhaust pipes 78 and 78.

Embodiments of the present invention are explained above, but the present invention is not limited thereto and may be modified in a variety of ways as long as the modifications do not depart from the gist thereof.

The invention claimed is:

1. A hybrid vehicle including a hybrid power unit mounted on a vehicle body frame, the hybrid type power unit including:
    an engine having an engine body of which part is formed by a crankcase rotatably supporting a crankshaft;
    a transmission for changing speed of driving force transmitted from the crankshaft;
    an electric motor capable of transmitting the driving force to the transmission, characterized in that the electric motor is attached to a lower portion of a front face of the engine body, and comprises a motor shaft that is disposed parallel to the crankshaft; and
    a motor-side primary gear mechanism for transmitting power from the motor shaft of the electric motor to a transmission side, the motor-side primary gear mechanism including a pair of idle gears, wherein one of the idle gears is disposed coaxially with the crankshaft.

2. The hybrid vehicle according to claim 1, wherein
    the exhaust pipe comprises an upstream end thereof connected to a front face of a cylinder head which forms a portion of the engine body extends rearwardly below the engine body from the front of the engine body, and at least a portion of the electric motor is disposed in a region surrounded by the lower portion of the engine body and the exhaust pipe in a side view.

3. The hybrid vehicle according to any one of claims 1 and 2, wherein
    a control unit and a battery are disposed above the crankcase.

4. The hybrid vehicle according to claim 1, wherein
    the engine body is mounted on the vehicle body frame with a cylinder axis thereof inclined rearwardly and upwardly, an intake system is connected to a front face of an upper portion of the engine body, and the electric motor located below the intake system is attached to the lower portion of the front face of the engine body.

5. The hybrid vehicle according to any one of claims 1, 2, and 4, wherein
    the electric motor is disposed on an opposite side of an axis of the crankshaft from an input shaft of the transmission, and a distance between an axis of the motor shaft included in the electric motor and the axis of the crankshaft is set substantially equal to a distance between an axis of the input shaft and the axis of the crankshaft.

6. The hybrid vehicle according to claim 5, wherein the other one of the idle gears is disposed between vertical planes passing through the axis of the crankshaft and the axis of the motor shaft, respectively.

7. The hybrid vehicle according to claim 3, wherein
    the electric motor is disposed on an opposite side of an axis of the crankshaft from an input shaft of the transmission, and a distance between an axis of the motor shaft included in the electric motor and the axis of the crankshaft is set substantially equal to a distance between an axis of the input shaft and the axis of the crankshaft.

8. The hybrid vehicle according to claim 7, wherein the other one of the idle gears is disposed between vertical planes passing through the axis of the crankshaft and the axis of the motor shaft, respectively.

* * * * *